Dec. 11, 1945. E. W. LARSEN 2,390,596
APPARATUS FOR POSITIONING PARTS
Filed Jan. 9, 1943 2 Sheets-Sheet 2

INVENTOR
E. W. LARSEN
BY
ATTORNEY

Patented Dec. 11, 1945

2,390,596

UNITED STATES PATENT OFFICE 2,390,596

APPARATUS FOR POSITIONING PARTS

Einer W. Larsen, Elmhurst, Ill., assignor to Western Electric Company, Incorporated, New York, N. Y., a corporation of New York Application January 9, 1943, Serial No. 471,907

11 Claims. (Cl. 29—288)

This invention relates to apparatus for positioning parts, and more particularly to apparatus for positioning parts to be welded in a hydrogen atmosphere.

It is an object of the present invention to provide a simple apparatus for quickly and efficiently positioning parts to be worked on.

In accordance with one embodiment of the invention, an apparatus is provided for properly positioning an article to be welded at two diametrically opposed spots inside a hydrogen bell. This apparatus comprises a hood or bell which may be moved up to permit the mounting of a plurality of articles on rotatable article supports which are, in turn, mounted on a rotatable table. After articles are mounted on the rotatable supports, the hood or bell may be lowered and a single manipulative device may be operated to rotate alternately the supports and table whereby all articles on the supports will be moved into association with a welding electrode, extending into the hood or bell, and separately rotated to present both sides of the article to the electrode.

Figure 1:
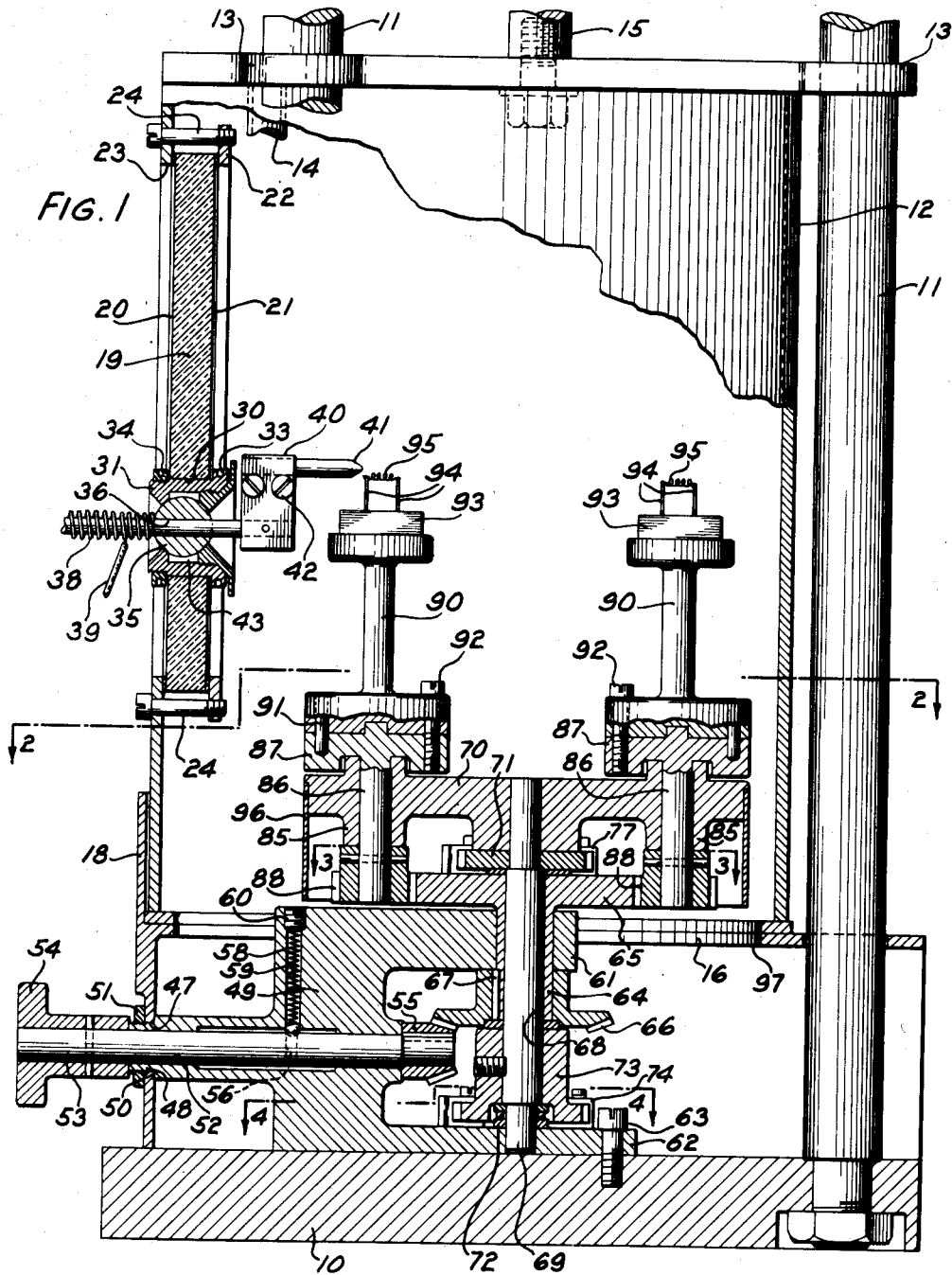
Figure 2:
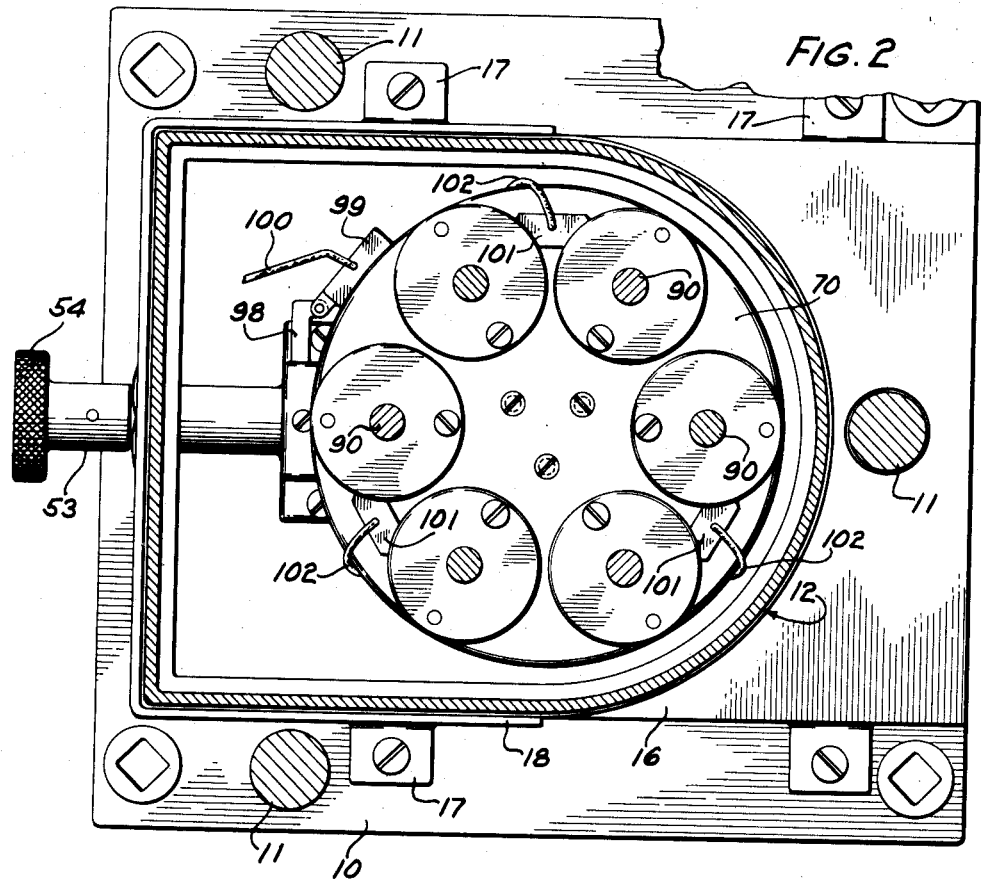
Figure 3:
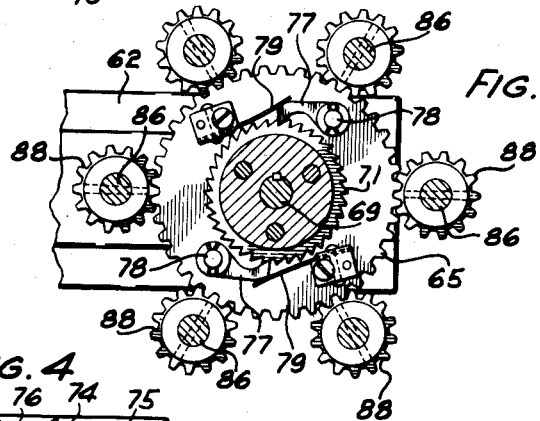
Figure 4:
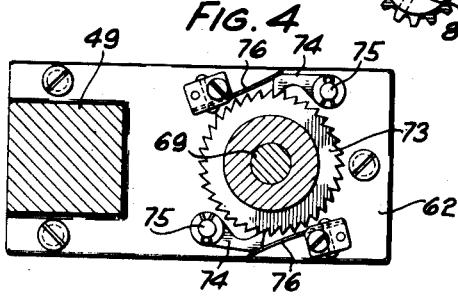

A better understanding of the invention may be had by reference to the following detailed description of one embodiment thereof when considered in conjunction with the accompanying drawings, wherein Fig. 1 is an elevational view, partially in section, of a hydrogen bell in which articles to be welded may be positioned for association with a welding electrode;

Fig. 2 is a horizontal sectional view taken substantially along the line 2—2 of Fig. 1 in the direction of the arrows, showing the arrangement of the article supports and table, and Figs. 3 and 4 are fragmentary horizontal sectional views taken substantially along the lines 3—3 and 4—4, respectively, of Fig. 1 in the direction of the arrows showing details of the mechanism for actuating the article supports and table.

In the drawings, wherein like reference characters designate the same parts in the several views, the apparatus is shown mounted on a base 10, from which three posts 11—11 extend upwardly for slidably guiding a bell or hood designated generally by the numeral 12. The hood 12 is provided with projections 13 for guiding it on the posts 11. These projections are formed by extensions of the top of the hood in which there is provided an entrance port 14, through which hydrogen may be pumped into the hood. In addition to the entrance port 14, the top of the bell or hood is provided with a rod 15 by means of which the hood may be raised or lowered. In the drawings, the hood is shown in its lowered position, where its lower end rests on a housing member 16 suitably mounted upon the base 10 being fixed thereon by means of lugs 17. The front portion of the housing 16 has an apron-like U-shaped projection 18 extending upwardly from it to seal the front portion of the hood from an operator using the welding apparatus in the hood. The front face of the hood 12 has a heavy glass window 19 formed of heavy plate glass and set in place between gaskets 20 and 21, a framework 22 being provided for pressing the gasket 21 against the window 19 and, in turn, pressing the gasket 20 against the inner face of the bell or hood, which is cut out as shown at 23 to form the window opening. The framework 22 for the window 19 is held in place by means of machine screws 24 threaded into the framework and extending through the bell around the window 19.

The window 19 has an aperture 30 formed in it into which there is set a socket member 31, which is internally threaded to receive a cooperating socket member 32. The socket member 31 is provided with a shoulder 33, which bears against the inside of the window 19, and is threaded externally to receive a locking member 34, whereby the socket member 31 may be retained in place in the window 19. The socket members 31 and 32 cooperate to position a ball 35 having an aperture 36 extending through it for receiving a shaft 37. The shaft 37 is normally held in the position shown by a compression spring 38, which tends to draw the shaft out of the hood. The outer end of the shaft has a flexible connection 39 attached to it for supplying electric current through the shaft to an electrode holder 40 carrying a welding electrode 41. The holder 40 is fixed on the inner end of the shaft and electrodes 41 may be attached to the holder 40 by any suitable clamping arrangement, for example, the locking screws 42. Any suitable packing material may be placed, as indicated at 43, for sealing the joint between the ball 35 and the socket members 31 and 32. The central aperture formed through the two socket members is chamfered so that a relatively large amount of movement may be imparted to the electrode 41 by manipulating the shaft 37 from outside the bell 12.

The housing member 16 is provided at its lower front face with an aperture 47, into which there is fitted a threaded extension 48 of a block 49. The threaded extension 48 terminates at a shoulder 50 and may be locked with respect to the front face of the housing member 16 by means of a lock nut 51. A central aperture 52 is formed in the threaded extension 48 for receiving a manually operable shaft 53 carrying at its outer extremity a knurled knob 54. Mounted on the inner end of the shaft 53 is a bevelled gear 55 and intermediate its ends the shaft has a hole 56 drilled through it into which a ball 57 is urged by a compression spring 58 positioned in an aperture 59 and held against the ball 57 by means of a set screw 60. Thus, when the knob 54 is manipulated, the operator may feel the resistance to rotation of the shaft 53 whenever the ball 57 is urged into the hole 56.

The block 49 is provided with two horizontally extending portions 61 and 62, the portion 62 resting on the base 10 and being fixed thereto by machine screws 63. The horizontally extending portion 61 of the block 49 has the shank 64 of a large sun gear 65 journalled in it and the shank 64 has a bevelled gear 66 keyed to it at 67 in position to mesh with the bevelled gear 55, whereby, when the knob 54 is rotated in either direction, motion will be imparted through the gears 55 and 56 to the sun gear 65. The shank 64 of the gear 65 is provided with a central aperture 68, in which a shaft 69 is freely rotatable. The shaft 69 has fixed to its upper end a table 70 and just below the table there is fixed to the shaft a ratchet 71. The lower end of the shaft 69 rests in a thrust bearing 72 and just above the thrust bearing there is attached to the shaft a ratchet 73. The teeth of the ratchets 71 and 73 are oppositely disposed for a purpose that will become apparent as the description progresses.

A pair of pawls 74—74 are pivoted at 75—75 on the horizontally extending portion 62 of the block 49 and are urged into engagement with the teeth of the ratchet 73 by leaf springs 76—76, as shown most clearly in Fig. 4. Mounted on the upper surface of the sun gear 65 are a pair of pawls 77 pivotally mounted on studs 78—78 extending from the upper surface of the gear. The pawls 77 are urged into engagement with the teeth of the ratchet 71 by means of leaf springs 79—79.

Due to the arrangement of the teeth of the pawls 71 and 73 in opposite directions, rotation of the shaft 53 in one direction will cause the pawls 77 to drive the ratchet 71 and when this occurs, the pawls 74 will ride over the teeth of the ratchet 73. When the shaft 53 is rotated in the opposite direction, the pawls 77 will ride over the teeth of the ratchet 71 and the pawls 74 will engage the teeth of the ratchet 73 to prevent the shaft 69 from turning, and, consequently, the table 70 will not be turned at this time. The table 70 will, however, be rotated when the gear 65 is rotated counter-clockwise (Fig. 3) due to the action of the pawls 77 on the ratchet 71.

The table 70 has six bearings 85—85 equally spaced about it for receiving six shafts 86—86. The shafts 86 have head portions 87—87 on their upper ends and have pinions 88 fixed to them at their lower ends. The pinions 88 mesh with the sun gear 65 and when the table 70 is held stationary and the sun gear 65 is rotated clockwise, the gear 65 will drive all of the pinions 88 thereby to rotate the shafts 86 about their own axes. When the large gear 65 is rotated in a clockwise direction, the table 70 will be prevented from turning with the gear 65 by the pawls 74 engaging the teeth of the ratchet 73 and thus the pinions 88 will be rotated about their own axes. The head portions 87 of the shafts 86 carry work supports 90 fixed to them by means of a pin 91 and a machine screw 92 for each work support. These work supports are in the present embodiment of the invention adapted to support a base member 93 from which extend a pair of leads 94 that are to be interconnected by a filament 95 welded to them at the point where the filament engages the leads.

It should be noted at this time that the table 70 is provided with a circumferentially extending apron or dust shield 96 and that the bottom of the bell or hood 12 is open and communicates with an aperture 97 formed in the housing member 16. Furthermore, it should be noted that the rear of the housing is open so that any accidental explosions occurring within the bell 12 will flash through the aperture 97 and out through the open rear portion of the housing 16.

Mounted on an arm 98 extending outwardly and upwardly from the block 49 is a brush assembly 99 bearing against and conductively connecting the table 70 with the source of welding current (not shown) through a lead 100. In order to provide a good electrical connection between the table 70 and article supports 90, brush assemblies 101 are mounted on the table and urged to engage the work supports in any suitable manner. The brush assemblies 101 are connected to the table 70 by means of leads 102.

A better understanding of the invention may be had by reference to the following brief description of the mode of operation thereof. After a series of articles including the base member 93, the leads 94, and filaments 95, have been placed on the work supports 90, the hood 12 being held in its upper position by means of the rod 15 during the loading of the apparatus, the hood 12 may be lowered to the position shown and hydrogen pumped into the bell through the entrance port 14. As soon as enough hydrogen has been pumped into the bell 12 to drive the air out of the bell, welding operations may be performed for welding the filaments 95 to the leads 94, one of which will be positioned directly in alignment with the welding electrode 41. The electrode 41 may then be manipulated to bring it to position to create an arc from the lead 94 closest to it for welding the filament 95 to the lead 94, power for forming the arc being supplied through the leads 39 and 100. As soon as the first welding operation has been completed, the operator may rotate the knob 54 in a direction to drive the gear 65 in a clockwise direction. When the gear 65 is rotated in a clockwise direction, the pawls 74 engaging the ratchet 73 will prevent the shaft 69 from turning and, consequently, the table 70 will remain motionless while the gear 65 rotates clockwise to drive the pinions 88 and cause the shafts 86 to rotate counterclockwise on their own axes. The gear ratio between the gears 55 and 66 is such that one-half rotation of the knob 54 will, through the gear 65 and pinions 88, cause the work support 90 to be rotated through one-half revolution, thus to bring the second lead 94 on the work support 90 into association with the welding electrode 41 and the operator may feel the increased resistance to rotation of the knob 54 by the ball 57 entering the hole 56 in the shaft 53 and will thus know that the work support is now properly positioned to have the second lead mounted thereon welded to the filament 95. As soon as the welding of the second lead to the filament 95 is completed, the operator may rotate the knob 54 in the opposite direction, thereby to drive the gear 65 in a counterclockwise direction. When the gear 65 is driven in a counterclockwise direction, the pawls 77 will drive the ratchet 71 counterclockwise thereby to rotate the table 70 in a counterclockwise direction carrying all of the shafts 86 and the mechanism mounted on them around the axis of the shaft 69. One-half turn of the knob 54 will cause the next work support 90 mounted on the table 70 to be moved into association with the electrode 41 and the welding of the filament on the work support 90 in association with the electrode may proceed. It should be noted that the operator in manipulating the work supports and table, utilizes a single knob and that rotation of the knob 54 in opposite directions will alternately cause the table to rotate and the work supports to rotate.

What is claimed is:

1. An apparatus for supporting articles to be worked on comprising a rotatable table, article supports rotatable with respect to said table, and common drive means for said table and supports comprising a manually rotatable shaft, a gear driven from said shaft and having pawls thereon, a ratchet associated with the gear to be driven by the pawls thereon when the shaft is rotated in one direction, said table being fixed to said ratchet for movement therewith, a plurality of shafts journalled in said table, one of said article supports being mounted on each of said shafts, means for preventing movement of the table when said shaft is rotated in the opposite direction, and gears fixed to each of said plurality of shafts and in mesh with the pawl carrying gear for driving the article supports when said shaft is rotated in said opposite direction.

2. An apparatus for supporting articles to be worked on comprising a rotatable table, article supports rotatable with respect to said table, and a common drive means for said table and supports comprising a manually rotatable shaft, a gear driven from said shaft and having pawls thereon, a ratchet associated with the gear to be driven by the pawls thereon when the manually rotatable shaft is rotated in one direction, said table being fixed to said ratchet for movement therewith, a plurality of shafts journalled in said table, one of said article supports being mounted on each of said shafts, a shaft for supporting said table, a ratchet fixed to said table-supporting shaft, pawls for preventing said table-supporting shaft from rotating when the manually rotatable shaft is rotated in the opposite direction, and gears on the work support shafts meshing with the pawl supporting gear for rotating the work support shafts when said manually rotatable shaft is rotated in said opposite direction.

3. In an apparatus for supporting articles to be worked on, a pawl supporting gear, a plurality of gears surrounding and meshing with the pawl-supporting gear to be driven thereby, a rotatable table, a ratchet fixed to said table for driving it, a pawl on said pawl-supporting gear for driving the ratchet when the pawl-supporting gear rotates in one direction, work supports rotatably mounted on said table and fixed to the gears surrounding the pawl-supporting gear to be driven by said pawl-supporting gear when the pawl-supporting gear rotates in the opposite direction, and means for preventing rotation of the table when the pawl supporting gear rotates in said opposite direction.

4. In an apparatus for supporting articles to be worked on, a rotatable table, work supports rotatably mounted on said table, a main driving gear, means for rotating the main driving gear in opposite directions, means interconnecting the table and main driving gear and operative to drive the table when the main driving gear is rotated in one direction, and means interconnecting the main driving gear and work supports including means for holding the table stationary, and means operative to rotate the work supports about their own axes when the main driving gear is rotated in the opposite direction.

5. In an apparatus for supporting articles to be worked on, a rotatable table, work supports rotatably mounted on said table, a gear, means for rotating the gear in opposite directions, means interconnecting the table and gear and operative to rotate the table when the gear is rotated in one direction comprising a ratchet fixed to said table and pawls mounted on the gear, and means interconnecting the gear and work supports and operative to rotate the work supports when the gear is rotated in the opposite direction.

6. In an apparatus for supporting articles to be worked on, a rotatable table, work supports rotatably mounted on said table, a main gear, means for rotating the main gear in opposite directions, means interconnecting the table and main gear and operative to rotate the table when the main gear is rotated in one direction comprising a ratchet fixed to said table and pawls mounted on the main gear, and means interconnecting the main gear and work supports and operative to rotate the work supports when the main gear is rotated in the opposite direction comprising gears meshing with the main gear, and shafts fixed to the work supports for supporting the gears in mesh with the main gear.

7. In an apparatus for supporting articles to be worked on, a rotatable table, a shaft for supporting said table, pawl and ratchet means associated with said shaft for preventing said table from rotating in one direction, a main gear freely rotatable about said shaft, pawls mounted on said main gear, a ratchet fixed to said table for engagement by the pawls on the main gear for driving said table in a direction opposite to said one direction upon rotation of the main gear in said opposite direction, work supports rotatably mounted on said table, shafts for driving said work supports, and gears on said work support driving shafts in mesh with the main gear for rotating the work support driving shafts on their own axes upon rotation of the main gear in said one direction.

8. In an apparatus for supporting articles to be worked on, a rotatable table, a shaft for supporting said table, pawl and ratchet means associated with said shaft for preventing said table from rotating in one direction, a main gear freely rotatable about said shaft, pawls mounted on said main gear, a ratchet fixed to said table for engagement by the pawl on the main gear for driving said table in a direction opposite to said one direction upon rotation of the main gear in said opposite direction, work supports rotatably mounted on said table, shafts for driving said work supports, gears on said work support driving shafts in mesh with the main gear for rotating the work support driving shafts on their own axes upon rotation of the main gear in said one direction, and an actuating shaft manually rotatable in opposite directions to drive said main gear.

9. An apparatus for supporting parts to be worked on comprising a plurality of rotatable work supports for presenting a plurality of portions of an article to a work position, a supporting table for supporting the work supports, means for rotating the work supports about their individual axes, means for rotating the table to carry the work supports about a common axis, and a common manipulative means for imparting rotation to the supports and the table including a pawl and ratchet mechanism for preventing rotation of the table in one direction.

10. An apparatus for supporting parts to be worked on comprising a plurality of rotatable work supports for presenting a plurality of portions of an article to a work position, a supporting table for supporting the work supports, means for rotating the work supports about their individual axes, means for rotating the table to carry the work supports about a common axis, and a common manipulative means for imparting rotation to the supports and the table including a pawl and ratchet mechanism for preventing rotation of the table in one direction and a second pawl and ratchet mechanism for driving the table.

11. An apparatus for supporting articles to be worked upon comprising a rotatable table, a rotatable shaft to which said table is rigidly secured, a plurality of work supports, a plurality of shafts rotatably journalled in said table, one for each of said work supports, a main gear rotatably mounted on said table shaft, a gear meshing with said main gear rigidly secured to each of said work support shafts, a reversible driving member, unidirectional drive means responsive to the actuation of said reversible driving member in one direction to interlock said main gear and said table to rotate said table and work supports as a unit, and means responsive to the actuation of said reversible member in the opposite direction for locking said table against rotation and driving said main gear to rotate said work supports and their respective shafts.

EINER W. LARSEN.